(12) United States Patent
Ishikawa et al.

(10) Patent No.: US 7,486,191 B2
(45) Date of Patent: Feb. 3, 2009

(54) RFID TAG

(75) Inventors: Naoki Ishikawa, Kawasaki (JP); Shunji Baba, Kawasaki (JP); Hidehiko Kira, Kawasaki (JP); Hiroshi Kobayashi, Kawasaki (JP); Takayoshi Matumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 166 days.

(21) Appl. No.: 11/378,623

(22) Filed: Mar. 20, 2006

(65) Prior Publication Data

US 2007/0139203 A1   Jun. 21, 2007

(30) Foreign Application Priority Data

Dec. 20, 2005   (JP) .............................. 2005-366980

(51) Int. Cl.
*G08B 13/14* (2006.01)
(52) U.S. Cl. .................... 340/572.7; 156/560; 438/106; 235/492
(58) Field of Classification Search ............... 340/572.1
See application file for complete search history.

(56) References Cited

U.S. PATENT DOCUMENTS

| | | | |
|---|---|---|---|
| 6,407,669 B1 | 6/2002 | Brown et al. .............. | 340/572.1 |
| 2003/0168514 A1 | 9/2003 | Rancien et al. .............. | 235/492 |
| 2005/0085010 A1* | 4/2005 | Tsunoda et al. .............. | 438/106 |
| 2005/0093677 A1 | 5/2005 | Forster et al. .............. | 340/10.1 |
| 2005/0134461 A1 | 6/2005 | Gelbman et al. ......... | 340/572.8 |

FOREIGN PATENT DOCUMENTS

| | | |
|---|---|---|
| DE | 199 62 194 A1 | 6/2001 |
| EP | 0 977 145 | 2/2000 |
| JP | 2000-200332 | 7/2000 |
| JP | 2000-311226 | 11/2000 |
| JP | 2001-351082 | 12/2001 |
| JP | 2001-351083 | 12/2001 |

OTHER PUBLICATIONS

European Search Report dated Mar. 27, 2008.

* cited by examiner

*Primary Examiner*—Benjamin C. Lee
*Assistant Examiner*—Ojiako Nwugo
(74) *Attorney, Agent, or Firm*—Kratz, Quintos & Hanson, LLP

(57) ABSTRACT

The present invention relates to an RFID tag performing exchange of information with an external device without contact, and is to improve the resistance to bending while avoiding an increase in the thickness of the RFID tag. A circuit chip is bonded to a base portion of a base with a thermosetting adhesive. The base is folded, and an ultraviolet curing adhesive is applied on the circuit chip. The fold-back portions of the base are folded back onto the circuit chip, to which portions ultraviolet light is irradiated, as a result, both of the surfaces of the circuit chip are bonded to the base with the adhesives.

4 Claims, 6 Drawing Sheets

RFID TAG

BACKGROUND OF THE INVENTION

1. Field of the Invention

The present invention relates to an RFID (Radio Frequency IDentification) tag performing exchange of information with an external device without contact. Noted that the term "RFID tag", as used herein, may be referred to as "RFID tag inlay" as an internal component (inlay) for the "RFID tag" among those skilled in the art. Alternatively, the "RFID tag" may be referred to as a "radio IC tag". Further, the "RFID tag" also includes a non-contact IC card.

2. Description of the Related Art

In recent years, there have been proposed various types of RFID tags which exchange information with an external device in a non-contact manner by means of radio waves, as represented by a reader-writer. There is proposed a kind of the RFID tag which is constituted by mounting an antenna pattern and a circuit chip (IC chip) for radio communication on a base sheet consisting of a plastic, a paper and the like (see, for example, Japanese Patent Laid-Open No. 2000-311226, Japanese Patent Laid-Open No. 2000-200332, Japanese Patent Laid-Open No. 2001-351082). As for the RFID tag of this type, a using form is considered in which the RFID tag attached to an article and the like performs exchange of information about the article with an external device, thereby effecting identification of the article and the like.

FIG. 1 is a top view showing an example of an RFID tag.

The RFID tag 1 shown in FIG. 1 is constituted by an antenna 12 provided on a base 13 which consists of a sheet-like PET film and the like, and by a circuit chip 11 which is electrically connected to the antenna 12 by soldering and the like and which is secured to the base 13 with an adhesive.

The Circuit chip 11 constituting the RFID tag 1 is capable of performing radio communication and exchange of information with an external device via the antenna 12.

Here, FIG. 1 shows, as the antenna 12 of the RFID tag 1, an antenna having a shape extending from the circuit chip 11 placed in the center of the RFID tag to the both sides of the circuit chip. However, the antenna 12 is not limited to this type, and a loop-shaped antenna and antennas having other various shapes may be employed as the antenna 12.

FIG. 2 is a figure explaining a state on the occurrence of a problem in a conventional RFID tag. FIG. 3 shows an enlarged view showing a portion within a circle R shown in Part (B) of FIG. 2 and explaining the problem which occurs in the state shown in Part (B) of FIG. 2.

Noted that the antenna is not shown in FIG. 2, FIG. 3 and in each of figures hereafter explained.

Depending on the application of the RFID tag 1, in addition to the using form in which the RFID tag 1 is attached in the flat state as it is as shown in Part (A) of FIG. 2, the RFID tag 1 may be stuck to a curved surface so that bending force is applied to the RFID tag, as shown in Part (B) of FIG. 2.

When bending force is applied to the RFID tag 1 as shown in Part (B) of FIG. 2, the problem may arise that an adhesive 14 is peeled from a base 13, as a result of which the electrical connection between a circuit chip 11 and an antenna (not shown, see FIG. 1) is not maintained and thereby the communication function is obstructed.

FIG. 4 is a figure showing an example of a preventive measure against the peeling shown in FIG. 3.

In FIG. 4, a circuit chip 11 on a base 13 is sealed with a mold resin 15. When such sealing processing by means of the mold resin is applied, the flexural strength is improved, but the entire thickness is increased, which leads to a result going against the demand for the reduction in thickness and size.

In view of the above described circumstances, the present invention provides an RFID tag having significantly enhanced resistance to bending force with little increase in the thickness.

SUMMARY OF THE INVENTION

The present invention has been made in view of the above circumstances and provides an RFID tag including: a base; a communication antenna provided on the base; and a circuit chip which is connected to the antenna and which performs radio communication via the antenna, wherein the base is folded to sandwich the circuit chip, and wherein the circuit chip is attached to the both surfaces of the folded base, the surfaces facing the circuit chip.

The RFID tag according to the present invention has a structure in which the circuit chip is sandwiched by the base. The base may be made of a thin sheet material so that the thickness can be hardly increased and at the same time the resistance against bending force can be significantly improved.

Here, in the RFID tag according to the present invention, the base may include: a base portion on which the circuit chip is placed; a first fold-back portion which is extended from the base portion and folded back to cover one half portion of the circuit chip; and a second fold-back portion which is extended from the base portion in the direction opposite to the first fold-back portion and folded back to cover the remaining half portion of the circuit chip except the half portion covered by the first fold-back portion. Alternatively, the base may include: a base portion on which the circuit chip is placed; and a fold-back portion which is extended from the base portion to cover the entire surface of the circuit chip.

According to the present invention, as described above, an RFID tag which is thin and strong against folding is realized.

DETAILED DESCRIPTION OF THE INVENTION

In the following, embodiments according to the present invention will be described.

Figure 5:
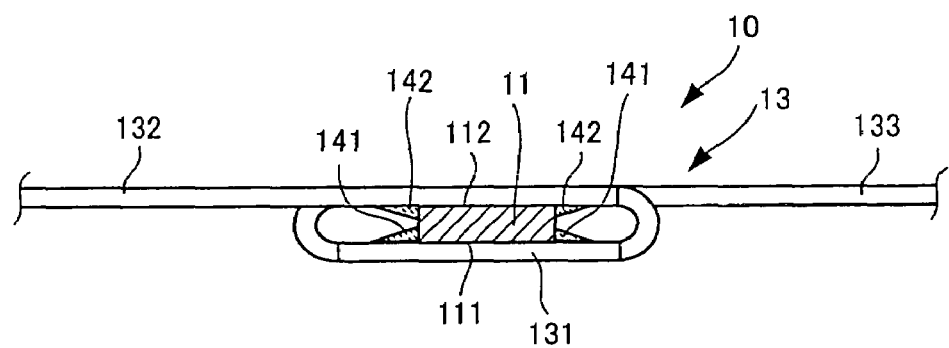
FIG. 5 is a side view of an RFID tag as an embodiment according to the present invention.
Figure 6:
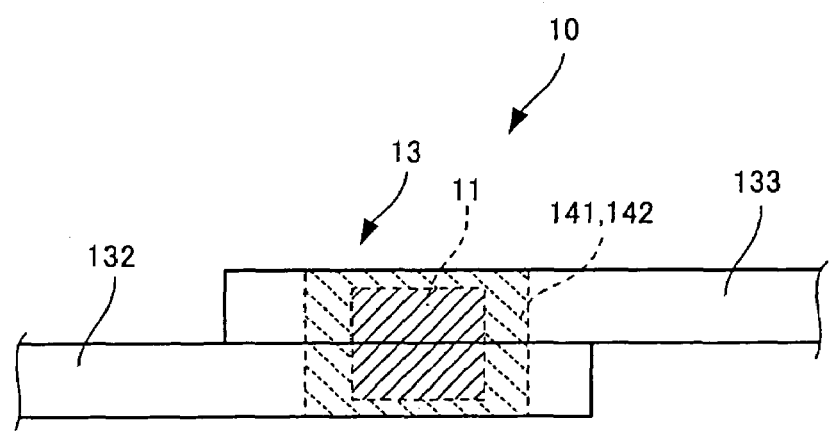
FIG. 6 is a top view of the RFID tag shown in FIG. 5.

FIG. 5 is a side view of an RFID tag as an embodiment according to the present invention, and FIG. 6 is a top view of the RFID tag shown in FIG. 5.

The RFID tag 10 shown in FIG. 5 and FIG. 6 has a structure in which a base 13 is folded back so as to sandwich a circuit chip 11.

The base 13 has a base portion 131 which is in contact with a lower surface 111 of the circuit chip 11, a first fold-back portion 132 which is extended from the base portion 131, and which is folded back to be in contact with and to cover a half portion of an upper surface 112 of the circuit chip 11, and a second fold-back portion 133 which is extended from the base portion 131 in the direction opposite to the first fold-back portion 132, and which is fold back to be in contact with and to cover the remaining half portion of the upper surface 112 of the circuit chip 11 except the half portion covered by the first fold-back portion 132.

Further, the side of the lower surface 111 of the circuit chip 11 is bonded with an adhesive 141 to the surface of the base portion 131, the surface facing the side of the circuit chip, and the side of the upper surface 112 of the circuit chip 11 is bonded with an adhesive 142 to surfaces of the first fold-back portion 132 and the second fold-back portion 133, the surfaces facing the side of the circuit chip.

Figure 1:
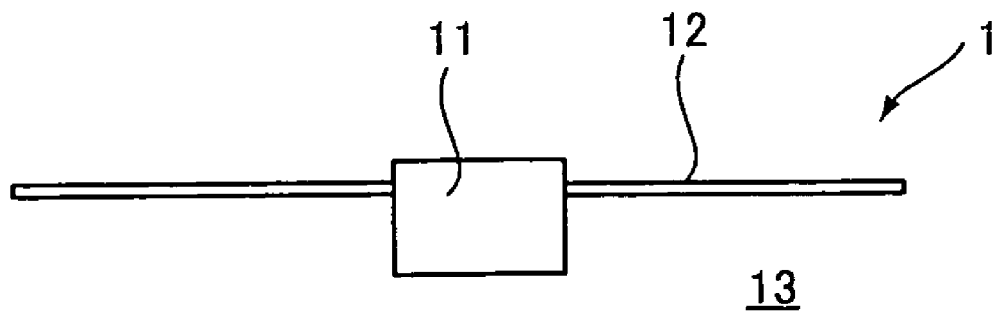
FIG. 1 is a top view showing an example of an RFID tag.
Figure 2:
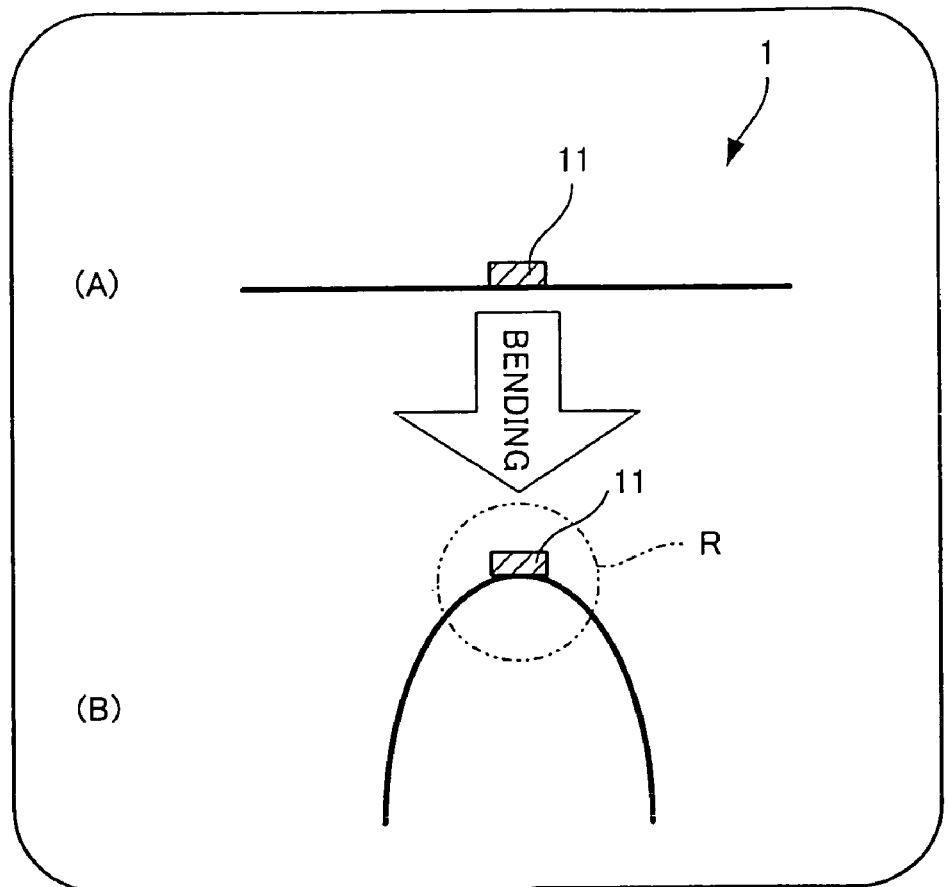
FIG. 2 is a figure explaining a state on the occurrence of a problem in a conventional RFID tag.
Figure 3:
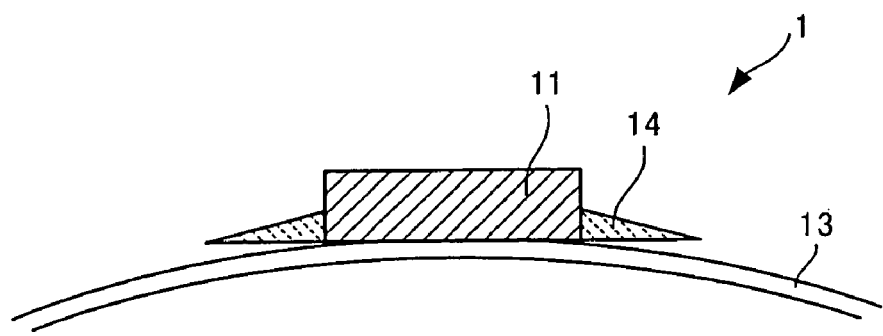
FIG. 3 is an enlarged view showing a portion in a circle R shown in Part (B) of FIG. 2, and explaining the problem which occurs in the state shown in FIG. 2.
Figure 4:
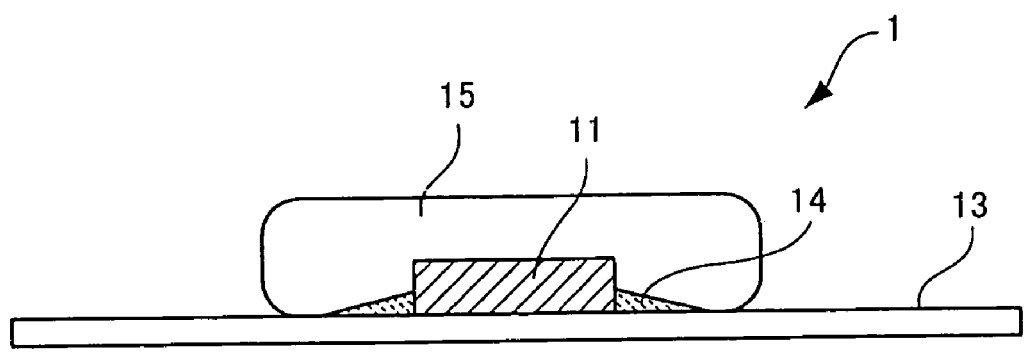
FIG. 4 is a figure showing an example of a preventive measure against the peeling shown in FIG. 3.

In the RFID tag 1 according to the embodiment shown in FIG. 5 and FIG. 6, the thickness needs to be increased only by a sheet of thin base, as compared with the prior art form shown in FIG. 1 to FIG. 3, so that it is possible to greatly improve the resistance against bending force by hardly increasing the thickness of the RFID tag.

Figure 7:
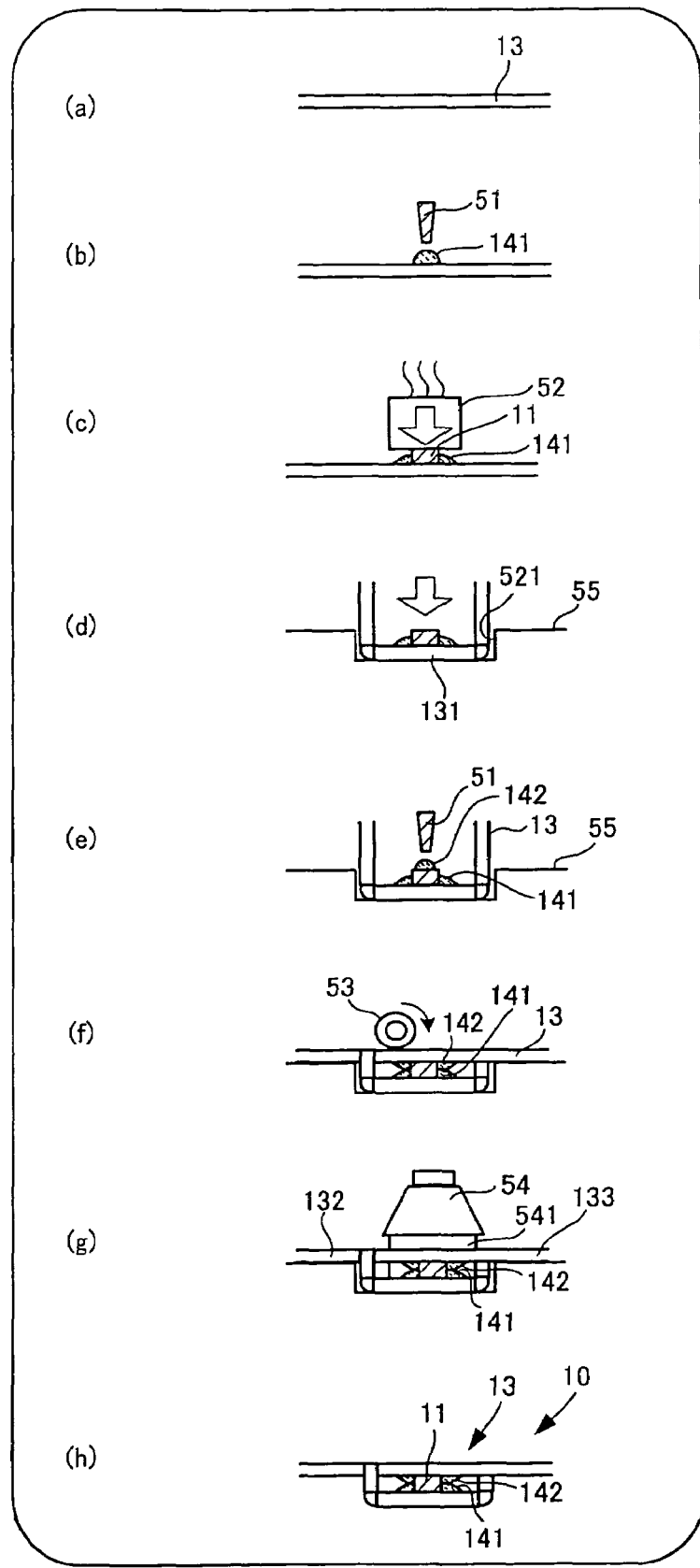
FIG. 7 is a figure showing a manufacturing process of the RFID tag shown in FIG. 5 and FIG. 6.

FIG. 7 is a figure showing a manufacturing process of the RFID tag shown in FIG. 5 and FIG. 6.

First, an antenna (not shown; see FIG. 1) is formed on a base 13 (Part (a) of FIG. 7), on which a thermosetting adhesive 141 is applied by a nozzle 51 (Part (b) of FIG. 7), and a circuit chip 11 is arranged on the adhesive 141. The circuit chip 11 and the antenna are heated and compressed by a heating/compressing head 52 so as to be solder-connected with each other (Part (c) of FIG. 7), and the circuit chip 11 is fixed on a base portion 131 of the base 13 by thermally curing the adhesive 141.

Next, the base portion 131 of the base 13 is forced into a recess 521 which is formed in a plate 55 (Part (d) of FIG. 7), and an adhesive 142 which is cured by receiving the irradiation of ultraviolet light is applied on the circuit chip 11 by the nozzle 51 (Part (e) of FIG. 7). Then, the base 13 is folded by a roller 53 (Part (f) of FIG. 7), and the adhesive 142 is cured by receiving irradiation of ultraviolet rays 541 from an ultraviolet lamp 54 (Part (g) of FIG. 7). Thereby, the circuit chip 11 is fixed to the first fold-back portion 132 and the second fold-back portion 133 of the base 13 (Part (h) of FIG. 7). The RFID tag shown in FIG. 5 and FIG. 6 is formed through these processes.

Figure 8:
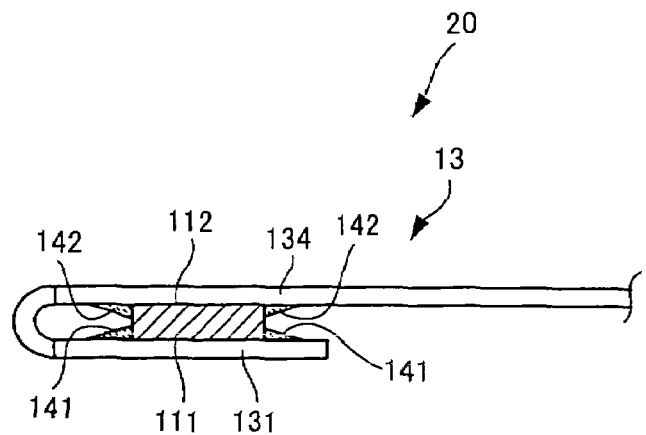
FIG. 8 is a side view of an RFID tag as another embodiment according to the present invention.
Figure 9:
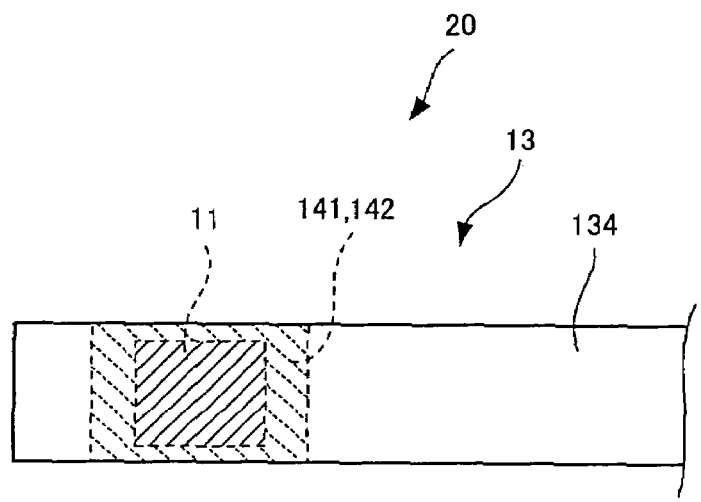
FIG. 9 is a top view of the RFID tag shown in FIG. 8.

FIG. 8 is a side view of an RFID tag as another embodiment according to the present invention, and FIG. 9 is a top view of the RFID tag shown in FIG. 8.

Similarly to the RFID tag 10 shown in FIG. 5 and FIG. 6, an RFID tag 20 shown in FIG. 8 and FIG. 9 has a structure in which a base 13 is folded back so as to sandwich a circuit chip 11.

However, the base 13 has a base portion 131 on which a circuit chip 11 is placed and which is in contact with a lower surface 111 of the circuit chip 11, and a fold-back portion 134 which is extended from the base portion 131 and folded back so as to be in contact with the entire surface of an upper surface 112 of the circuit chip 11, thereby covering the entire surface of the circuit chip 11.

The side of the lower surface 111 of the circuit chip 11 is bonded with an adhesive 141 to the surface of the base portion 131 of the base 13 on the side of the circuit chip 11, and the side of the upper surface 112 of the circuit chip 11 is bonded with an adhesive 142 to the surface of the fold-back portion 134 of the base 13 on the side of the circuit chip 11.

Also in the case of the RFID tag 20 shown in FIG. 8 and FIG. 9, the thickness needs to be increased only by a sheet of thin base, as compared with the prior art form shown in FIG. 1 to FIG. 3, so that it is possible to greatly improve the resistance against bending force by hardly increasing the thickness of the RFID tag.

Figure 10:
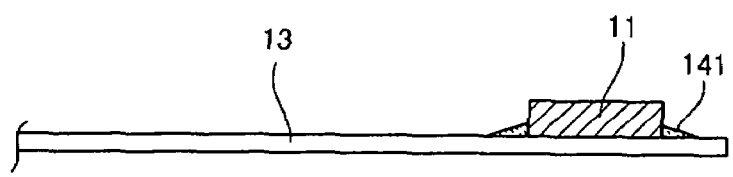
FIG. 10 is a figure explaining a manufacturing process of the RFID tag shown in FIG. 8 and FIG. 9.

FIG. 10 is a figure explaining a manufacturing process of the RFID tag shown in FIG. 8 and FIG. 9.

Here, similarly to the processes shown in Part (a) of FIG. 7 to Part (c) of FIG. 7, an antenna (not shown) is formed on a base 13. A thermosetting adhesive 141 is applied to one end of the base 13 and a circuit chip 11 is placed on the adhesive 141. The circuit chip 11 and the antenna are heated and compressed so as to be connected with each other, and the circuit chip 11 is fixed to the base 13 by the adhesive 141.

Next, similarly to the process shown in Part (d) of FIG. 7, the base portion 131 of the base 13 is forced into the recess 521 of the plate 55 so that the fold-back portion 134 is folded back. Then, similarly to the processes shown in Part (e) of FIG. 7 to Part (g) of FIG. 7, the ultraviolet curing adhesive is applied on the upper surface 112 of the circuit chip 11, the fold-back portion 134 is then further folded back, and the adhesive is cured by receiving irradiation of ultraviolet light. As a result, the RFID tag 20 having a shape shown in FIG. 8 and FIG. 9 is formed.

The RFID tag according to the present invention, as shown in the two embodiments described above, has a structure in which the circuit chip 11 is sandwiched by the base 13, and both the lower surface 111 and the upper surface 112 of the circuit chip 11 are bonded to the base 13. As a result, in the RFID tag according to the present invention, it is possible to greatly improve the resistance against bending force by hardly increasing the thickness of the RFID tag, as compared with the prior art form shown in FIG. 1 to FIG. 3.

What is claimed is:

1. An RFID tag comprising:
   a base;
   a communication antenna provided on the base; and
   a circuit chip which is connected to the antenna and which performs radio communication via the antenna,
   wherein the base is folded to sandwich the circuit chip, and
   wherein the circuit chip is attached to both surfaces of the folded base, the surfaces facing the circuit chip; and
   wherein the base comprises:
   a base portion on which the circuit chip is placed;
   a first fold-back portion which is extended from the base portion and folded back to cover one half portion of the circuit chip; and
   a second fold-back portion which is extended from the base portion in the direction opposite to the first fold-back portion and folded back to cover the remaining half portion of the circuit chip except the half portion covered by the first fold-back portion.

2. The RFID tag according to claim 1, wherein the base comprises:
   a base portion on which the circuit chip is placed; and
   a fold-back portion which is extended from the base portion and folded back to cover the entire surface of the circuit chip.

3. The RFID tag according to claim 1, wherein the circuit chip is directly attached to both surfaces of the folded base.

4. The RFID tag according to claim 1, wherein both the upper and lower surfaces of the circuit chip are bonded with an adhesive to surfaces of both of the first fold-back portion and the second fold-back portion, whereby the circuit chip is directly attached to both surfaces of the folded base.

* * * * *